J. PARA.
TROLLEY.
APPLICATION FILED AUG. 19, 1912.
1,047,692.
Patented Dec. 17, 1912.
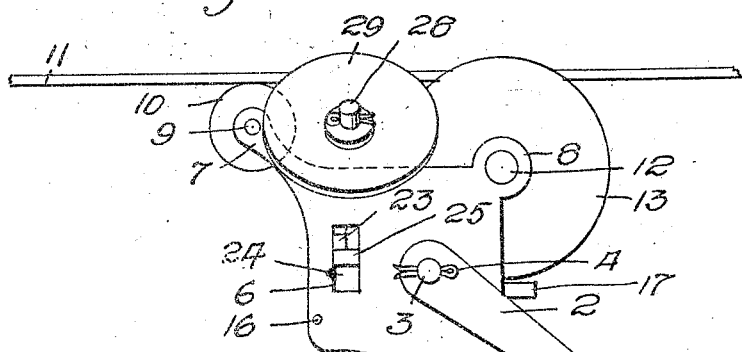
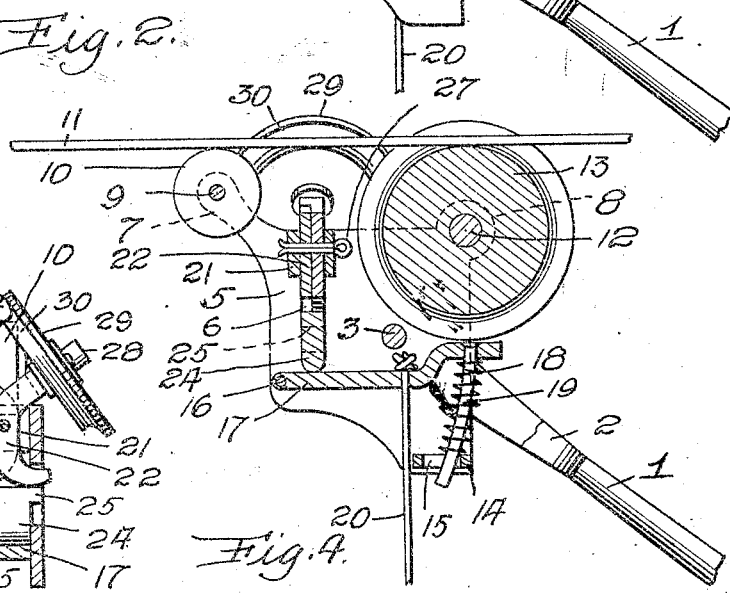
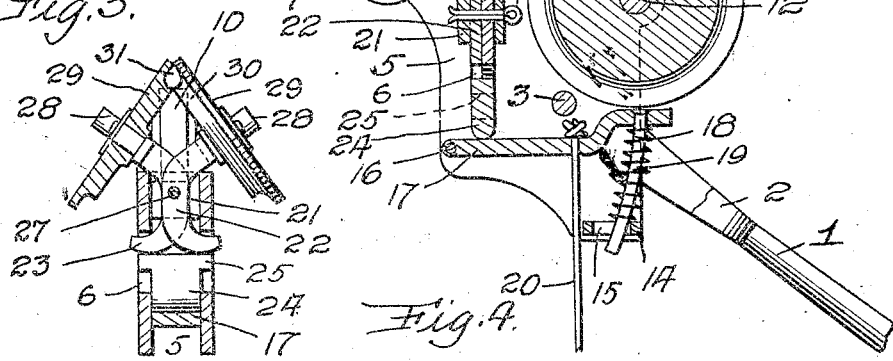
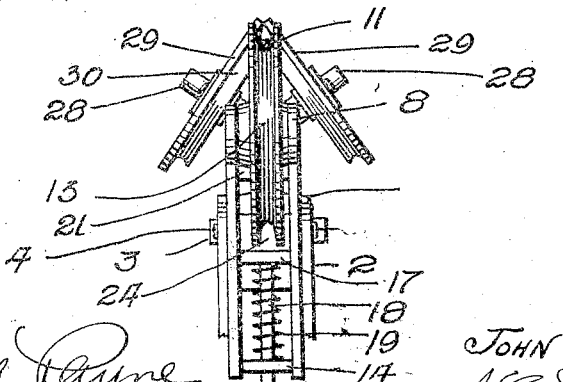
WITNESSES
Samuel Payne
R. H. Butler
INVENTOR
John Para
ATTORNEYS

UNITED STATES PATENT OFFICE.

JOHN PARA, OF ELIZABETH, NEW JERSEY.

TROLLEY.

1,047,692.  Specification of Letters Patent.  Patented Dec. 17, 1912.

Application filed August 19, 1912. Serial No. 715,841.

*To all whom it may concern:*

Be it known that I, JOHN PARA, a citizen of the United States of America, residing at Elizabeth, in the county of Union and State of New Jersey, have invented certain new and useful Improvements in Trolleys, of which the following is a specification, reference being had therein to the accompanying drawing.

This invention relates to trolleys and has for its object to provide a device of such class with means in a manner as hereinafter set forth for maintaining the trolley wheel in engagement with the trolley wire and to further provide a device with means in a manner as hereinafter set forth whereby the trolley can be conveniently detached from the trolley wire when occasion so requires.

Further objects of the invention are to provide a trolley which is comparatively simple in its construction and arrangement, strong, durable, efficient in its use, readily set up and comparatively inexpensive to manufacture.

With the foregoing and other objects in view, the invention consists of a novel construction, combination and arrangement of parts as hereinafter more specifically described and illustrated in the accompanying drawings wherein is shown an embodiment of the invention, but it is to be understood that changes, variations and modifications can be resorted to which come within the scope of the claims hereunto appended.

In the drawings:—Figure 1 is a side elevation showing a trolley in accordance with this invention in operative position with respect to a trolley wire, Fig. 2 is a vertical sectional view, broken away, Fig. 3 is a cross sectional view, one of the retaining wheels being shown in section, and Fig. 4 is a rear elevation.

Referring to the drawings in detail 1 denotes a trolley pole provided at its upper end with a harp 2 having mounted in the arms thereof a shaft 3 secured in position by cotter pins 4. Eccentrically mounted upon the shaft 3 within the harp 2 is a pair of vertically disposed plates 5 each provided near its forward edge with a vertically extending slot 6. Each of said plates 5 has projecting from its upper forward corner an inclined arm 7 and further has projecting from its rear upper corner a circular extension 8.

Mounted in the arms 7 is a shaft 9 carrying a roller 10 which is adapted, when the trolley is in operative position, to travel against the trolley wire 11 and mounted in the extension 8 is a shaft 12 having revolubly mounted thereon a trolley wheel 13 which engages the trolley wire 11 when the trolley is in operative position.

Interposed between the plates 5 at their rear lower corners is a cross member 14 provided with a slot 15. Arranged between the plates 5 and having its forward end pivotally mounted upon the cross bar 16 is a resiliently supported holding member 17. The latter at its rear end is offset with respect to its forward portion and has fixed thereto a depending curved arm 18 which extends through the opening 15. Surrounding the arm 18 and interposed between the members 14, 17 is a coiled spring 19, the function of which is to maintain the rear end of the member 17 elevated. Connected to the member 17 is a lowering cable 20 which when pulled downwardly will shift the rear of the member 17 upon its pivot 16 against the elevating action of the spring 19.

Extending between the plates 5, as well as being secured thereto at the top of the forward portion of said plates, is a pair of spaced supports 21 having arranged there between a pair of curved and oppositely disposed shifting arms 22, 23 having their lower ends resting upon a vertically movable actuating block 24 which is positioned between the plates 5 and rests upon the member 17. The plate 24 is provided with a pair of oppositely disposed lugs 25 which extend into the opening 6. The lower ends of the arms 22, 23 also extend through the opening 6 but permanently rest upon the top edge of the block 24. The arms 22, 23 are pivotally mounted upon a pin 27 which extends through the said arms and supports 21.

Projecting from each of the arms 22, 23 is an inclined shaft 28 carrying a holding roller 29. The shafts 28 are oppositely disposed with respect to each other and the rollers 29 are mounted upon said shafts at an inclination. The rollers are arranged above the plates 5, projecting toward each other and have their edges thereof grooved as at 30 so that when the rollers are in abutting engagement an opening 31 is provided through which extends a trolley wire 11. The function of the rollers 29, when in the position shown in Figs. 3 and 4, is to maintain the trolley wheel 13 in engagement with the trolley wire 11, due to the fact that the rollers overlap the wire 11. The rollers 29 are of such weight that they will overbalance the lower ends of the arms 22, 23 when these latter are not supported by the block 24. It will be assumed that the parts are in the position as shown in Fig. 3. By pulling downwardly on the member 17, the block 24 is lowered releasing the arms 22 and 23 whereby the weight of the rollers 29 will cause the arms 22 and 23 to rock on their pivots 27, the rollers 29 swinging away from each other, which enables the trolley to be disconnected from the trolley wire 11. The roller or wheel 10 is utilized as a guide and to also prevent, in connection with the trolley wheel 13, the trolley shifting above the wire 11 when the rollers 29 are moved apart.

What I claim is:—

1. A trolley comprising a pole, a harp carried thereby, a pair of vertically disposed plates eccentrically mounted in said harp spaced from each other, a trolley wheel journaled in said plates, a pair of holding rollers carried by said plates and adapted to overlap the trolley wire for maintaining the trolley wheel in engagement with said wire, shifting arms for said rollers, a vertically movable plate engaging with said arms to prevent the shifting movement thereof, a spring controlled support for said vertically movable plate, and means for shifting said support to permit of the lowering of said vertically movable plate and the shifting of said arms so said rollers can move apart.

2. A trolley comprising a pole, a harp carried thereby, a pair of vertically disposed plates eccentrically mounted in said harp spaced from each other, a trolley wheel journaled in said plates, a pair of holding rollers carried by said plates and adapted to overlap the trolley wire for maintaining the trolley wheel in engagement with said wire, shifting arms for said rollers, a vertically movable plate engaging with said arms to prevent the shifting movement thereof, a spring controlled support for said vertically movable plate, means for shifting said support to permit of the lowering of said vertically movable plate and the shifting of said arms so said rollers can move apart, and a guide roller connected to said plates rearwardly of said holding rollers.

In testimony whereof I affix my signature in the presence of two witnesses.

JOHN PARA.

Witnesses:
JAMES McCRORIE,
EDWARD J. BARTWICK.